United States Patent
Thayer

(10) Patent No.: US 6,662,839 B1
(45) Date of Patent: Dec. 16, 2003

(54) VEHICLE REARVIEW MIRROR AND WINDSHIELD PROTECTION SYSTEM

(76) Inventor: Reg L. Thayer, 4112 S. Ong, Amarillo, TX (US) 79110-1343

( * ) Notice: Subject to any disclaimer, the term of this patent is extended or adjusted under 35 U.S.C. 154(b) by 0 days.

(21) Appl. No.: 10/208,577

(22) Filed: Jul. 30, 2002

(51) Int. Cl.$^7$ ............................................. B65D 65/02
(52) U.S. Cl. ..................................... 150/168; 296/95.1
(58) Field of Search ................................. 150/154, 160, 150/166–168; 296/95.1, 97.7, 136; 280/770; D12/187, 188, 182, 183; 2/158, 159, 161.1, 161.4, 64, 18, 19; 206/315.4

(56) References Cited

U.S. PATENT DOCUMENTS

| | | | | |
|---|---|---|---|---|
| 3,263,736 A | * | 8/1966 | Macomson | 160/370.21 |
| 3,391,724 A | * | 7/1968 | Charlesworth | 160/370.21 |
| 3,665,355 A | * | 5/1972 | Sasaki et al. | 335/306 |
| 4,834,157 A | | 5/1989 | Smith | |
| 4,915,488 A | | 4/1990 | Lambert et al. | |
| 5,035,460 A | * | 7/1991 | Huang | 295/95.1 |
| 5,115,848 A | | 5/1992 | Malone | |
| 5,133,141 A | | 7/1992 | Bane | |
| 5,161,849 A | * | 11/1992 | Holland, Jr. | 296/95.1 |
| 5,406,649 A | * | 4/1995 | Bolembach | 2/158 |
| 5,421,628 A | | 6/1995 | Nahm | |
| D379,034 S | | 5/1997 | DeSatnick | |
| 5,704,475 A | * | 1/1998 | Jack | 206/315.4 |
| 5,706,519 A | * | 1/1998 | Cooper | 2/19 |
| D435,344 S | | 12/2000 | Harrison | |
| D446,270 S | * | 8/2001 | Bernath | D21/754 |
| 6,286,964 B1 | | 9/2001 | Litmer | |
| 6,321,805 B1 | * | 11/2001 | Suggs | 150/160 |
| 6,325,121 B1 | | 12/2001 | Hudnall | |

OTHER PUBLICATIONS

Fazel, Pub. US 2001/0050097 A1, Dec. 13, 2001.*

* cited by examiner

*Primary Examiner*—Lee Young
*Assistant Examiner*—Lien Ngo
(74) *Attorney, Agent, or Firm*—Dale J. Ream

(57) ABSTRACT

A system for protecting selected glass surfaces of a vehicle having a windshield and external rearview mirrors includes a pair of mirror covers and a windshield cover. Each mirror cover includes a bag-like body portion defining an open end capable of fitting over and completely covering an external mirror. Each mirror cover includes a strap that may be secured around a respective vehicle mirror support arm and adjustably attached to the mirror cover with corresponding hook and loop fastening material. The windshield cover includes a configuration for overlaying the vehicle windshield and includes straps that may be releasably coupled to respective mirror covers. The windshield cover includes magnets along an upper edge for selectively attaching the upper edge of the windshield cover to the roof of the vehicle.

14 Claims, 5 Drawing Sheets

VEHICLE REARVIEW MIRROR AND WINDSHIELD PROTECTION SYSTEM

BACKGROUND OF THE INVENTION

The present invention relates generally to vehicle covers and, more particularly, to a system for covering the external rearview mirrors and windshield of a vehicle so as to protect those surfaces from harsh winter weather conditions.

Much time and effort is devoted to scraping ice and snow from vehicle windshields and external rearview mirrors during the winter months in many geographic regions. Scraping ice and snow is difficult, inconvenient, and time-consuming. Although various devices have been proposed in the art for protecting vehicle glass surfaces, the existing devices do not provide a system for conveniently and completely covering the external rearview windows of a vehicle as well as the front windshield such that all of the covers may be conveniently secured together in use.

Therefore, it is desirable to have a system for selectively completely covering the external rearview mirrors of a vehicle. Further, it is desirable to have a covering system which also includes a windshield cover that is held in position with magnets and attachment to the rearview mirror covers.

SUMMARY OF THE INVENTION

A system for covering and protecting selected glass surfaces of a vehicle according to the present invention includes a pair of mirror covers for covering the external rearview mirrors that are mounted to a vehicle with mirror support arms. Each mirror cover is formed of a flexible, waterproof material in a bag-like configuration defining an open end. Thus, each mirror cover may be slipped over a respective rearview mirror until the mirror is completely covered. Each mirror cover includes an elongate strap adjacent its open end which may be wrapped around a respective mirror support arm so as to secure the mirror cover thereto. The strap and mirror cover include hook and loop fastening materials such that the strap is adjustable for tightness so as to conform the open end of the mirror cover about the rearview mirror and corresponding support arm.

The covering system further includes a windshield cover configured to overlay the front windshield of a vehicle. Both the windshield cover and mirror covers include straps with buckles such that the windshield cover may be releasably coupled to the mirror covers in use. In addition, the windshield cover includes magnets situated along an upper longitudinal edge thereof such that the upper edge may be selectively attached to a metallic surface of the vehicle, such as the roof. Therefore, the windshield cover may be securely held in position by its attachment to the mirror covers and by its magnetic attraction to the vehicle roof.

Therefore, a general object of this invention is to provide a system for covering selected glass surfaces of a vehicle, namely the windshield and external rearview mirrors.

Another object of this invention is to provide a covering system, as aforesaid, having rearview mirror covers that may be slipped over the rearview mirrors of a vehicle and conveniently securable thereto.

Still another object of this invention is to provide a covering system, as aforesaid, having a windshield cover configured to overlay a vehicle windshield.

Yet another object of this invention is to provide a covering system, as aforesaid, having straps and buckles configured to releasably secure the windshield cover to the mirror covers.

A further object of this invention is to provide a covering system, as aforesaid, in which an upper edge of the windshield cover includes a plurality of magnets such that the windshield cover is attachable to the roof of the vehicle.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

A system for covering and protecting selected glass surfaces of a vehicle according to the present invention will now be described in detail with reference to FIGS. 1 through 5 of the accompanying drawings. It is understood that the present invention is for use with a vehicle having a front windshield and one or two external rearview mirrors, the external rearview mirrors being mounted to the vehicle with corresponding mirror support arms.

Figure 4:
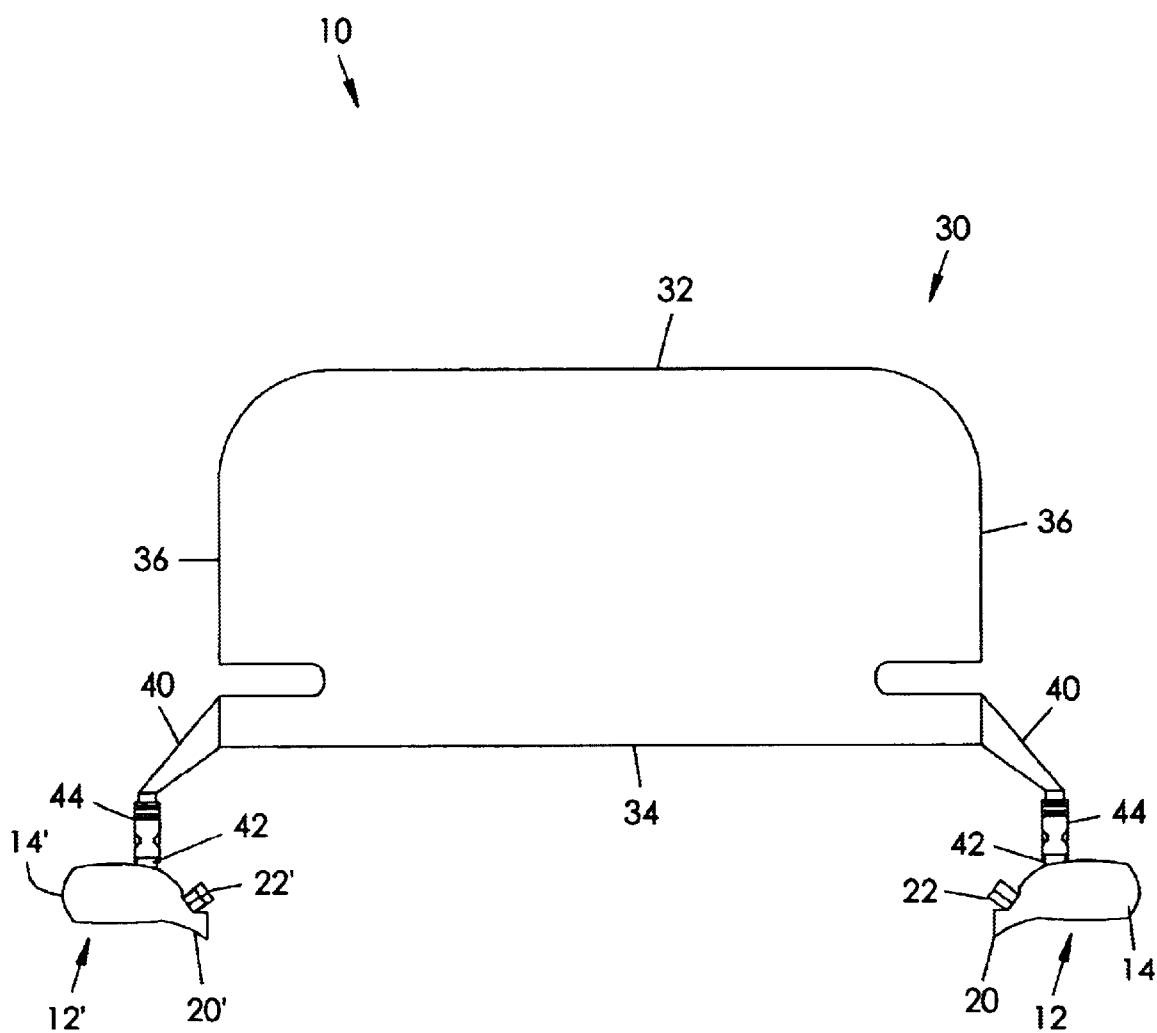
FIG. 4 is a front view of a windshield cover coupled to a pair of mirror covers according to the present invention.
Figure 5:
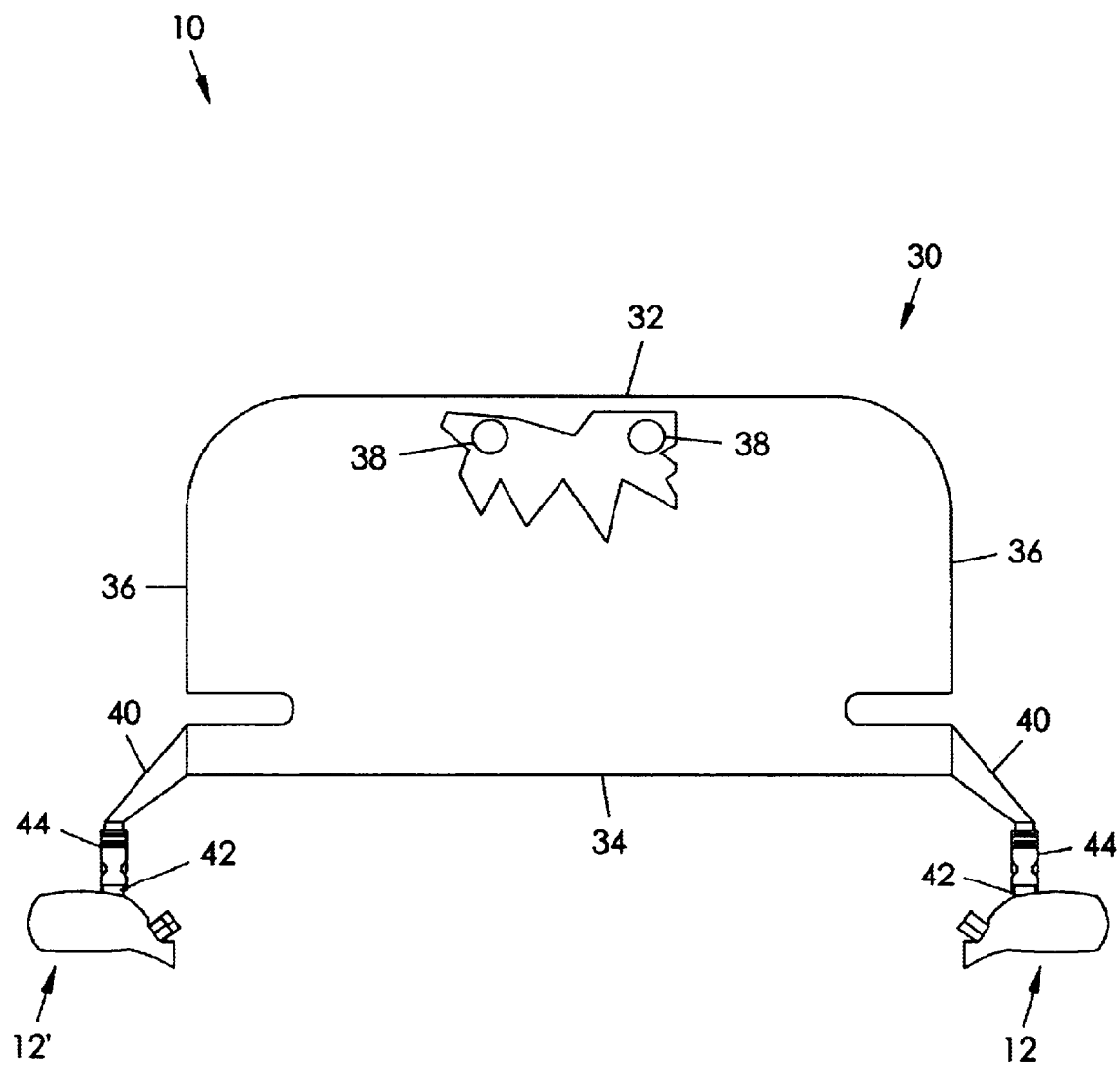
FIG. 5 is a front view as in FIG. 4 with a layer of the windshield cover broken away to show magnets situated therein.

A covering system 10 according to one embodiment of the invention includes first 12 and second 12' mirror covers (FIG. 4). Although the first mirror cover 12 will be described in detail, it is understood that the first 12 and second 12' mirror covers include substantially similar constructions, the second mirror cover 12' being referenced in the drawings with primed numbers corresponding to the reference numerals of like components of the first mirror cover 12. Therefore, each mirror cover may be fitted over either of a vehicle's external rearview mirrors. More particularly, the first mirror cover 12 includes a body portion 14 having a closed end 16 and defining an open end 18 in a bag-like configuration. The first mirror cover 12 may be fitted over a first rearview mirror of a vehicle in that the rearview mirror may be received into the first mirror cover 12 through the open end 18 thereof. The mirror covers are constructed of polychloroprene which is a flexible, stretchable, durable, and waterproof material although other rubber-like materials would also work.

Figure 1:
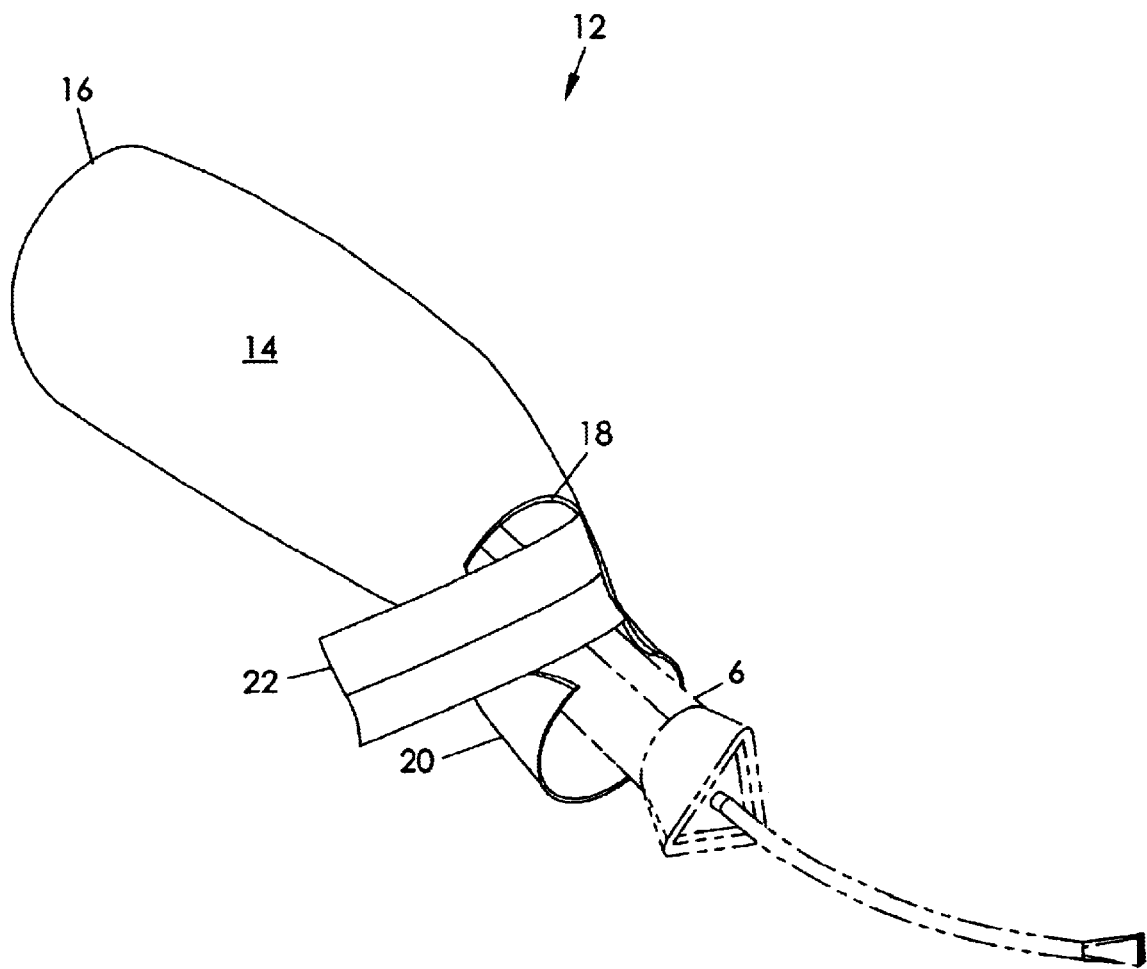
FIG. 1 is a perspective view of a mirror cover according to the preferred embodiment of the present invention in use on a vehicle external rearview mirror.

The first mirror cover 12 further includes a sleeve portion 20 attached to the body portion 14 adjacent the open end 18 thereof (FIG. 1). The sleeve portion 20 extends only partially about the circumference of the body portion 14 such that longitudinal edges of the sleeve portion 20 are not in contact with one another in their free state, as to be described further below. In other words, the sleeve portion 20 presents an open top that allows a first mirror support arm 6 to nest within the sleeve portion 20 when the first mirror cover 12 is fitted over the first rearview mirror.

A first end of an elongate first strap 22 is attached to the sleeve portion 20 of the first mirror cover 12 adjacent the open end of the body portion 14 thereof (FIG. 1). When the first mirror cover 12 is fitted over the first rearview mirror, the first strap 22 may be wrapped around the first mirror support arm 6 and coupled to the sleeve portion 20 such that the first mirror cover 12 is secured to the first mirror support arm 6 (FIG. 1). Preferably, the first strap 22 is secured to the sleeve portion 20 with hook and loop fastening material although snaps, clips, or other suitable fasteners would also work. More particularly, a hook and loop fastening material 24 is mounted to one side of the first strap 22 adjacent a free end thereof. (FIG. 2) Another hook and loop fastening material 26 is mounted to the outer surface of the sleeve portion 20 of the first mirror cover 12. Therefore, the first strap 22 may be adjustably and releasably attached to the body portion 14 of the first mirror cover 12 by engaging the hook and loop fasteners 24, 26. Tightening the first strap 22 about the first mirror support arm 6 conforms the first sleeve portion 20 and body portion 14 adjacent the open end 18 thereof about the first rearview mirror and first mirror support arm 6.

The covering system 10 further includes a windshield cover 30 having a generally rectangular configuration for overlaying the windshield of a vehicle. The windshield cover 30 is constructed of polychloroprene which is a flexible, durable, and waterproof material, although other durable, waterproof materials would also be suitable. The windshield cover 30 includes inner and outer layers. The windshield cover includes upper 32 and lower 34 longitudinal edges with opposed side edges 36 extending between the upper 32 and lower 34 edges. A plurality of magnets 38 are positioned between the inner and outer layers of the windshield cover 30 adjacent the upper longitudinal edge 32 thereof, although a single elongate magnet would also work. The magnets enable the upper edge 32 to be releasably attachable to a metallic surface of the vehicle, such as the roof thereof.

The windshield cover 30 may be releasably coupled to the mirror covers 12, 12' so as to maintain its position upon a vehicle windshield. More particularly, a first pair of straps 40 are attached to respective side edges 36 of the windshield cover 30 adjacent the lower longitudinal edge 34 thereof (FIG. 4). Similarly, a second pair of straps 42 are attached to respective body portions 14, 14' of the first 12 and second 12' mirror covers. Conventional buckle members 44 are attached to free ends of the straps for releasably coupling corresponding first 40 and second 42 straps together. Preferably, quick release buckles are used so as to maximize quick and convenient coupling of the windshield cover 30 to the first 12 and second 12' mirror covers, although other buckles or fasteners would also work.

Figure 2:
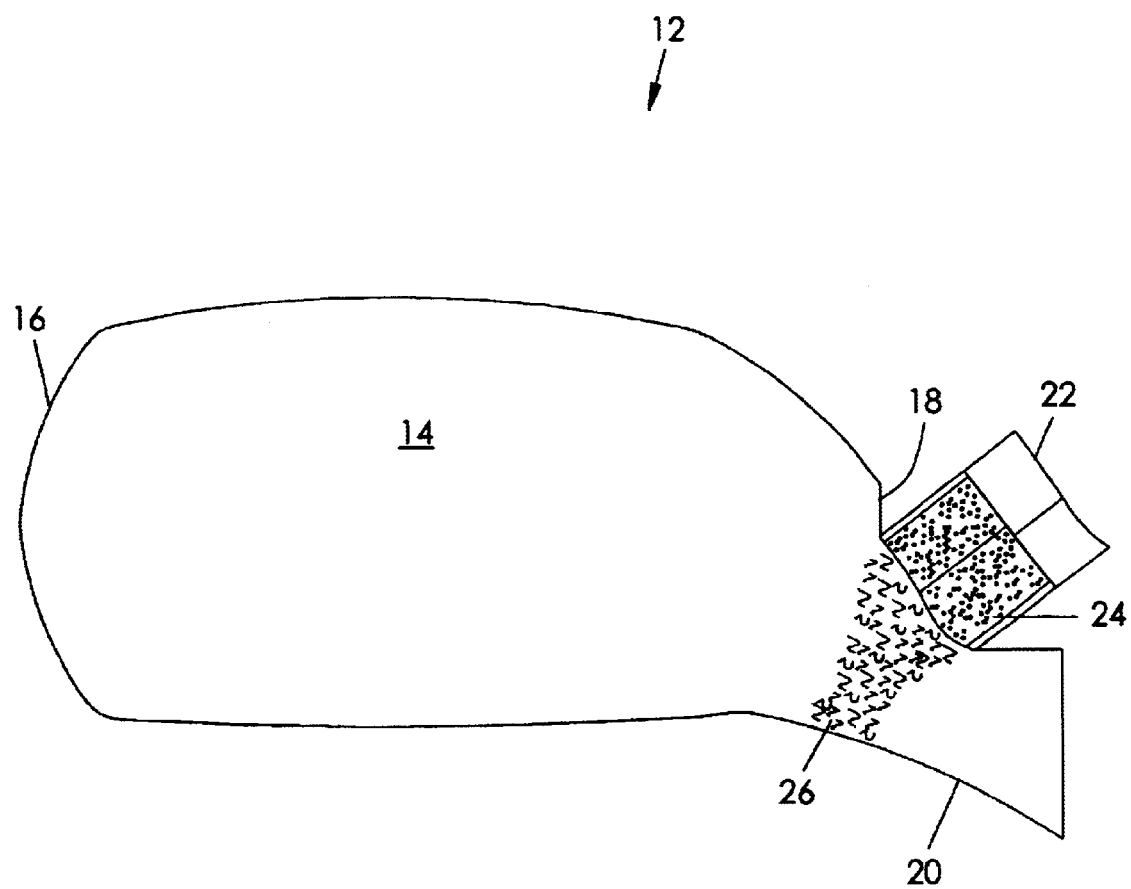
FIG. 2 is a side view of the mirror cover as in FIG. 1 removed from the external rearview mirror.

In use, the mirror covers 12, 12' and windshield cover 30 may be utilized to protect various glass surfaces of a vehicle from harsh winter weather elements. For example, the first mirror cover 12 may be fitted over a first vehicle external rearview mirror by slipping the first mirror cover 12 thereon, open end 18 first. Once the first mirror cover 12 completely covers the rearview mirror and the mirror support arm 6 is resting in the first mirror cover sleeve portion 20 (FIG. 1), the first strap 22 may be wrapped about the support arm 6 and adjustably and releasably coupled to the sleeve portion 20 with hook and loop fasteners (FIG. 2). The snug fit of the first mirror cover 12 about a mirror contributes to its waterproof characteristic. The second mirror cover 12' may be situated over a second rearview mirror in a substantially similar manner. If desired, the windshield cover 30 may be positioned to overlay a vehicle windshield. Magnets 38 within the windshield cover 30 cause the upper edge 32 thereof to be releasably attached to a vehicle roof. The windshield cover 30 may be coupled to the mirror covers 12, 12' with buckles 44 so as to keep the windshield cover 30 in proper position. These covers keep winter weather conditions off of the windshield and mirrors of a vehicle. Then, each of these covers may be removed in opposite fashion as described above when the vehicle needs to be driven, whereby the glass surfaces will be free of ice or snow.

Figure 3:
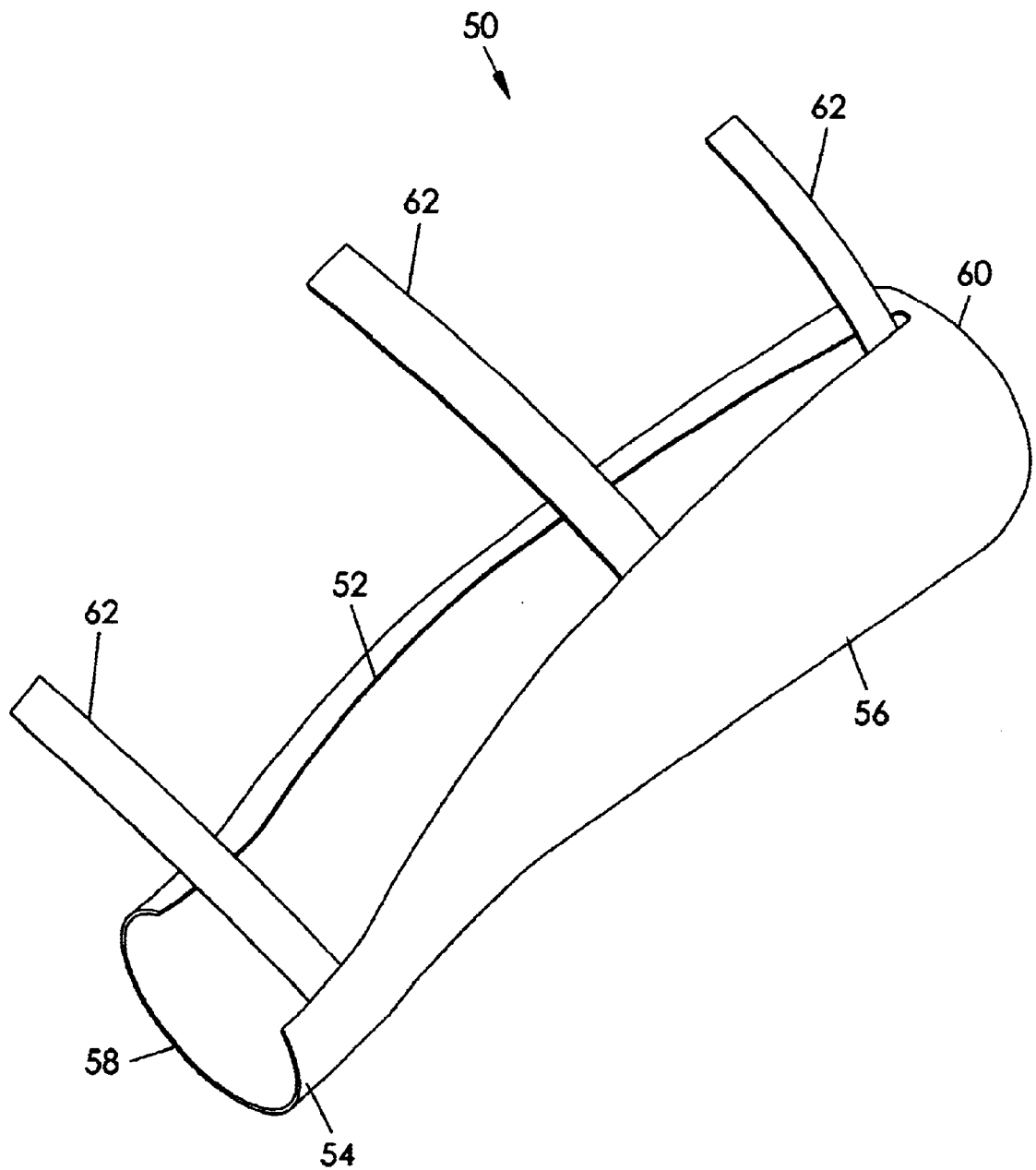
FIG. 3 is a perspective view of a mirror cover according to another embodiment of the present invention.

Another embodiment of a mirror cover 50 is shown in FIG. 3 and includes a construction substantially similar to that described previously except as specifically noted below. The slit 52 or opening of the sleeve portion 54 extends longitudinally between the open end 58 and a point adjacent the closed end 60 of the body portion 56. In other words, this mirror cover 50 may be opened almost completely such that it may be fitted over an external rearview mirror very easily. This mirror cover 50 then includes a plurality of straps 62 that are spaced apart along the slit 52 for securely closing the opening when the cover has be positioned on a mirror. Preferably, these straps 62 include hook and loop fasteners (not shown) in coordination with hook and loop fasteners (not shown) positioned on the outer surface of the mirror cover 50 for releasably closing the slit 52 and fastening the mirror cover 50 to a rearview mirror and its support arm.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A system for protecting selected glass surfaces of a vehicle, comprising:

a first mirror cover formed of a flexible material and having a bag configuration, said first mirror cover defining an open end and a closed end adapted to fit over a free end of a first external rearview mirror having a first mirror support arm connecting the first rearview mirror to the vehicle;

a first strap having a first end attached to said first mirror cover adjacent said first mirror cover open end thereof;

means for releasably securing said first strap to the first mirror support arm, said first strap adapted to conform said first mirror cover adjacent said first mirror cover open end about the first mirror support arm when said first strap is secured to the first mirror support arm;

a second mirror cover formed of a flexible material and having a bag configuration, said second mirror cover defining an open end and a closed end adapted to fit over a free end of a second external rearview mirror having a second mirror support arm connecting the second rearview mirror to the vehicle;

a second strap having a first end attached to said second mirror cover adjacent said open end thereof;

means for releasably securing said second strap to the second mirror support arm, said second strap adapted to conform said second mirror cover adjacent said second mirror cover open end about the second mirror support arm when said second strap is secured to the second mirror support arm;

a windshield cover formed of a flexible material, said windshield cover having a generally rectangular configuration adapted to overlay a vehicle windshield, said windshield cover having a pair of opposed windshield side edges and upper and lower edges extending longitudinally between said pair of side edges; and means for releasably coupling respective side edges of said windshield cover to said first and second mirror covers.

2. The system as in claim 1 wherein said coupling means includes:
   a first pair of straps depending from opposed side edges of said windshield cover, each of said first pair of straps having a free end;
   a second pair of straps depending from respective first and second mirror covers, each of said second pair of straps having a free end; and
   a plurality of buckle members attached to respective free ends of said first and second pair of straps for releasably coupling said first straps to respective second straps.

3. The system as in claim 1 further comprising at least one magnet attached to said upper edge of said windshield cover, whereby said windshield cover is releasably attachable to a metallic portion of the vehicle.

4. The system as in claim 1 wherein said fast and second mirror covers and said windshield cover are constructed of a waterproof material.

5. The system as in claim 4 wherein said waterproof material is polychloroprene.

6. The system as in claim 1 wherein said means for releasably securing said first strap includes:
   one of a hook and loop fastening material mounted to one side of said first strap; and
   another of a hook and loop fastening material mounted to said first mirror cover adjacent said open end thereof, whereby said first strap may be adjustably and releasably coupled to said first mirror cover by selectively engaging respective hook and loop fastening materials.

7. The system as in claim 1 wherein said means for releasably securing said second strap includes:
   one of a hook and loop fastening material mounted to One side of said second strap; and
   another of a hook and loop fastening material mounted to said second mirror cover adjacent said open end thereof, whereby said second strap may be adjustably and releasably coupled to said second mirror cover by selectively engaging respective hook and loop fastening materials.

8. A system for protecting selected glass surfaces of a vehicle having a windshield and first and second external rearview mirrors mounted to the vehicle with first and second mirror support arms, said system comprising:
   a first mirror cover formed of a flexible material and having a body portion defining an open end and a closed end adapted to fit over a free end of the first rearview mirror and to completely cover the first rearview mirror, said first mirror cover having a sleeve portion attached to said first mirror cover at said first mirror cover open end and adapted to surround the first mirror support arm when said first mirror cover is fit over the first rearview mirror;
   a first strap having a first end attached to said first mirror cover sleeve;
   means utilizing said first strap for releasably and adjustably securing said first mirror cover sleeve to the first support arm of the vehicle;
   a second mirror cover formed of a flexible material and having a body portion defining an open end and a closed end adapted to fit over a free end of the second rearview mirror and to completely cover the second rearview mirror, said second mirror cover having a sleeve portion attached to said second mirror cover at said second mirror cover open end and adapted to surround the second mirror support arm when said second mirror cover is fit over the second rearview mirror;
   a second strap having a first end attached to said second mirror cover sleeve;
   means utilizing said second strap for releasably and adjustably securing said second mirror cover sleeve to the second support arm of the vehicle;
   a windshield cover having inner and outer layers formed of a flexible material and having a generally rectangular configuration, said windshield cover having opposed side edges with upper and lower edges extending longitudinally between said side edges;
   a first pair of straps depending from opposed side edges of said windshield cover, each of said first pair of straps having a free end;
   a second pair of straps depending from respective first and second mirror covers, each of said second pair of straps having a free end; and
   a plurality of buckle members attached to respective free ends of said first and second pair of straps for releasably coupling said first straps to respective second straps such that said windshield cover is releasably coupled to said first and second mirror covers.

9. The system as in claim 8 further comprising at least one magnet situated between said inner and outer layers of said windshield cover such that said windshield cover is magnetically attachable to a metallic portion of the vehicle.

10. The system as in claim 8 wherein said first and second mirror covers are constructed of a waterproof material.

11. The system as in claim 10 wherein said waterproof material is polychloroprene.

12. The system as in claim 8 wherein said means for releasably and adjustably securing said first mirror cover sleeve to the first support arm of the vehicle includes:
   one of a hook and loop fastening material mounted to one side of said first strap; and
   another of a hook and loop fastening material mounted to a portion of said first sleeve, whereby said first strap may be adjustably and releasably coupled to said first mirror cover by selectively engaging said hook and loop fastening materials.

13. The system as in claim 12 wherein said means for releasably and adjustably securing said second mirror cover sleeve to the second support arm of the vehicle includes:
   one of a hook and loop fastening material mounted to one side of said second strap; and
   another of a hook and loop fastening material mounted to a portion of said second sleeve, whereby said second strap may be adjustably and releasably coupled to said second mirror cover by selectively engaging respective hook and loop fastening materials.

14. The system as in claim 8 wherein:
   said first mirror cover body and sleeve portions define a slit extending longitudinally between a free end of said first mirror cover sleeve portion and a point displaced from a distal end of said first mirror cover body portion relative to said first mirror cover sleeve portion, whereby said first mirror cover body and sleeve portions may be selectively opened for fitting said first mirror cover over the first rearview mirror and first mirror support arm;
   means for closing said slit in said first mirror cover;

said second mirror cover body and sleeve portions define a slit extending longitudinally between a free end of said second mirror cover sleeve portion and a point displaced from a distal end of said second mirror cover body portion relative to said second mirror cover sleeve portion, whereby said second mirror cover body and sleeve portions may be selectively opened for fitting said second mirror cover over the second rearview mirror and second mirror support arm; and means for closing said slit in said second mirror cover.

* * * * *